(12) United States Patent
Wilde

(10) Patent No.: US 7,057,796 B1
(45) Date of Patent: Jun. 6, 2006

(54) MICROMIRROR POSITION SENSING UNITS FOR RECONFIGURABLE OPTICAL SYSTEMS

(75) Inventor: Jeffrey P. Wilde, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 83 days.

(21) Appl. No.: 10/654,830

(22) Filed: Sep. 3, 2003

(51) Int. Cl.
*G02B 26/00* (2006.01)
*G02B 6/28* (2006.01)

(52) U.S. Cl. ............................ 359/291; 385/24
(58) Field of Classification Search ............ 359/223, 359/224, 290, 291, 298; 385/16–19, 24, 385/34, 37, 47
See application file for complete search history.

(56) References Cited

U.S. PATENT DOCUMENTS

| 6,680,776 B1 * | 1/2004 | Barrett .................. 356/73.1 |
| 6,801,684 B1 * | 10/2004 | Losch ..................... 385/18 |
| 2004/0207894 A1 * | 10/2004 | Hodges et al. ............ 359/212 |
| 2004/0228577 A1 * | 11/2004 | Pezeshki et al. .......... 385/31 |

* cited by examiner

*Primary Examiner*—Ricky Mack
*Assistant Examiner*—William Choi
(74) *Attorney, Agent, or Firm*—DLA Piper Rudnick Gray Cary US LLP

(57) ABSTRACT

This invention provides a wavelength-separating-routing (WSR) apparatus that uses a diffraction grating to separate a multi-wavelength optical signal by wavelength into multiple spectral channels that are communicated to an array of channel micromirrors, and which includes a micromirror position sensing unit to monitor the position of each of the channel micromirrors. The micromirror position sensing unit may include an array of position sensitive detectors or split detectors, which each receive a diverted fraction of one of the reflected spectral channels.

15 Claims, 3 Drawing Sheets

MICROMIRROR POSITION SENSING UNITS FOR RECONFIGURABLE OPTICAL SYSTEMS

FIELD OF THE INVENTION

This invention relates generally to optical communication systems. More specifically, it relates to novel micromirror position sensing units for dynamically reconfigurable optical systems, such as optical add-drop multiplexers (OADMs), optical multiplexers/demultiplexers, and optical cross-connects, for wavelength division multiplexed (WDM) optical networking applications.

BACKGROUND

In contemporary WDM optical networks, an essential building block is a device that can separate a multi-wavelength optical signal into multiple spectral channels and subsequently route the spectral channels into multiple output ports in a dynamically reconfigurable fashion. Such a device can be used to construct dynamic optical add-drop multiplexers (OADMs), optical multiplexers/demultiplexers, and optical cross-connects.

One type of wavelength separating and routing device includes an array of fiber collimators serving as one or more input ports and one or more output ports; a wavelength-separator; a beam-focuser; and an array of channel micromirrors. This type of wavelength separating and routing device is described for example in U.S. patent application Ser. Nos. 09/938,426, 10/005,714, 10/060,493 (now issued as U.S. Pat. No. 6,549,699), 10/076,145, and 10/143,651, all of which are assigned to the present assignee and incorporated herein by reference. In operation, a multi-wavelength optical signal emerges from an input port. The wavelength-separator separates the multi-wavelength optical signal into multiple spectral channels, each characterized by a distinct center wavelength and associated bandwidth. The beam-focuser focuses the spectral channels into corresponding focused spots. The channel micromirrors may be positioned such that each channel micromirror receives a unique one of the spectral channels. The channel micromirrors may also be individually controllable and movable (e.g., pivotable or rotatable), so as to reflect the spectral channels into selected output ports. As such, each channel micromirror may be assigned to a specific spectral channel, hence the name "channel micromirror". Each output port may receive any number of the reflected spectral channels.

Because the operation of such an optical system is dependent on the position of the channel micromirrors, it would be desirable to provide micromirror position sensing units for use in these types of optical systems. Particularly, it would be very useful to monitor the positions of the channel micromirrors in order to facilitate control of multiple spectral channels coupled into the output ports on a channel-by-channel basis and in a dynamic (or real-time) fashion.

SUMMARY OF THE INVENTION

The present invention provides an apparatus for sensing the position of channel micromirrors within an optical system, such as a wavelength-separating-routing (WSR) apparatus. The apparatus may be used to sense the positions of the channel micromirrors in order to facilitate control of multiple spectral channels coupled into the output ports on a channel-by-channel basis and in a dynamic (or real-time) fashion. A small portion of the multi-wavelength optical signal may be diverted and communicated to a micromirror position sensing apparatus. In one embodiment, the micromirror position sensing apparatus may include an array of position sensitive detectors. In another embodiment, the micromirror position sensing apparatus may include a plurality of split detectors. A controller may be also be used to monitor the position of the micromirrors and provide feedback control to the micromirrors or to other elements of the optical system.

According to one aspect of the present invention, an optical apparatus is provided. The optical apparatus includes multiple fiber collimators providing an input port for a multi-wavelength optical signal and a plurality of output ports; a wavelength-separator that separates the multi-wavelength optical signal by wavelength into multiple spectral channels; an array of channel micromirrors positioned such that each channel micromirror receives a unique one of the spectral channels, the channel micromirrors being individually controllable to reflect the spectral channels into selected output ports; and a micromirror position sensing unit which is disposed between the output ports and the channel micromirrors, the position sensing unit being adapted to receive portions of the reflected spectral channels for monitoring the position of the channel micromirrors.

According to another aspect of the present invention, a method for monitoring the position of channel micromirrors which control the transmission of a plurality of spectral channels in an optical apparatus is provided. The method includes the steps of: directing the plurality of spectral channels onto an array of channel micromirrors positioned such that each channel micromirror receives a unique one of the spectral channels, the channel micromirrors being individually controllable to reflect the spectral channels into selected ports; diverting portions of the reflected spectral channels onto a plurality of sensors; and monitoring the plurality of sensors to determine the position of the channel micromirrors.

These and other aspects, features and advantages of the present invention, as well as the invention itself, will be best understood from the following drawings and detailed description.

DETAILED DESCRIPTION OF THE EMBODIMENTS

In this specification and appending claims, a "spectral channel" is characterized by a distinct center wavelength and associated bandwidth. Each spectral channel may carry a unique information signal, as in WDM optical networking applications.

Figure 1:
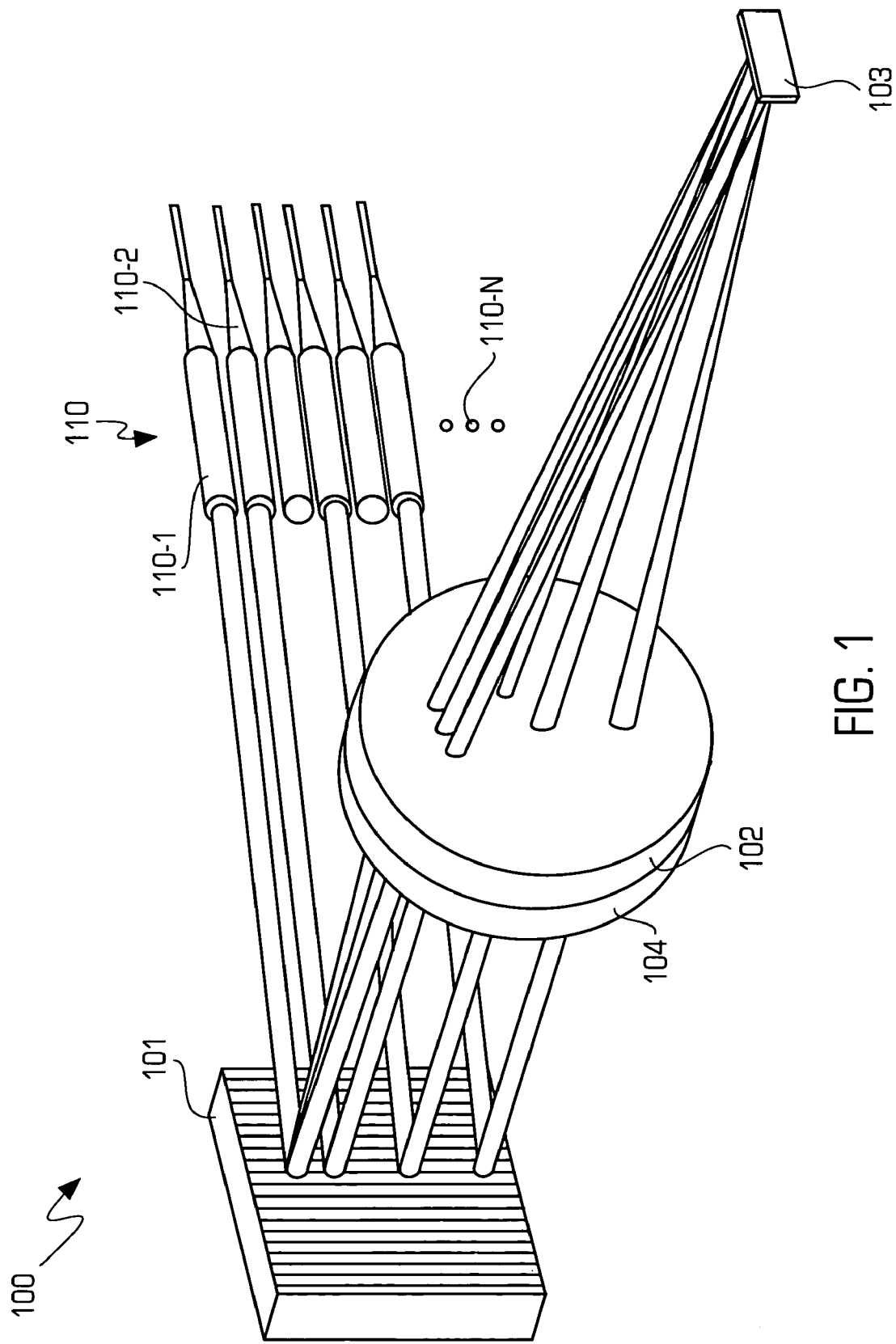
FIG. 1 illustrates a wavelength-separating-routing (WSR) apparatus for use with the present invention.

FIG. 1 depicts a wavelength-separating-routing (WSR) apparatus in which a micromirror position sensing apparatus may be implemented, according to the present invention. By way of example, the WSR apparatus 100 may include multiple input/output ports which in one form may be an array of fiber collimators 110, including an input port 110-1 and a plurality of output ports 110-2 through 110-N (N≧3); a wavelength-separator which in one form may be a diffraction grating 101; a beam-focuser in the form of a focusing lens 102; and an array of channel micromirrors 103. The WSR apparatus 100 may further include a quarter-wave plate 104, for compensating for polarization-dependent loss (PDL) a spectral channel may experience. This type of wavelength separating and routing device and variations thereof are described for example in U.S. patent application Ser. Nos. 09/938,426, 10/005,714, 10/060,493, 10/076,145, and 10/143,651, all of which are assigned to the present assignee and incorporated herein by reference. The WSR device may further include implement additional features and components, such as a servo-control unit, a processing unit, a polarization diversity scheme, and other desirable elements and features described in the above-delineated applications.

In operation, a multi-wavelength optical signal emerges from the input port 110-1. The diffraction grating 101 angularly separates the multi-wavelength optical signal into multiple spectral channels. The focusing lens 102 focuses the spectral channels into corresponding focused spots, e.g., in a spatial array. The channel micromirrors 103 are positioned such that each channel micromirror receives one of the spectral channels. The channel micromirrors 103 are individually controllable and movable, e.g., pivotable (or rotatable) under analog (or continuous) control, such that, upon reflection, the spectral channels are directed into selected ones of the output ports 110-2 through 110-N. As such, each channel micromirror is assigned to a specific spectral channel, hence the name "channel micromirror". Each output port may receive any number of the reflected spectral channels.

A distinct feature of the channel micromirrors 103, in contrast to those used in the prior art, is that the motion, e.g., pivoting (or rotation), of each channel micromirror is under analog control such that its pivoting angle can be continuously adjusted. This enables each channel micromirror to scan its corresponding spectral channel across all possible output ports and thereby direct the spectral channel to any desired output port. This further provides continuous control of the coupling efficiency of the spectral channel into the output port, which is an important attribute for spectral shaping (e.g., equalization).

For purposes of illustration and clarity, only a select few (e.g., three) of the spectral channels, along with the input multi-wavelength optical signal, are graphically illustrated in FIG. 1 and the following figures. It should be noted, however, that there could be any number of the spectral channels in a WSR apparatus of the present invention (so long as the number of spectral channels does not exceed the number of channel mirrors employed in the system). It should also be noted that the optical beams representing the spectral channels shown in FIG. 1 and the following figures are provided for illustrative purposes only (e.g., their sizes and shapes may not be drawn according to scale). For instance, the input beam and the corresponding diffracted beams generally may have different cross-sectional shapes, so long as the angle of incidence upon the diffraction grating is not equal to the angle of diffraction, as is known to those skilled in the art.

In the embodiment of FIG. 1, it is preferable that the diffraction grating 101 and the channel micromirrors 103 are placed respectively in the first and second (i.e., the front and back) focal planes (on the opposing sides) of the focusing lens 102. Such a telecentric arrangement allows the chief rays of the focused beams to be parallel to each other and generally parallel to the optical axis. In this application, the telecentric configuration further allows the reflected spectral channels to be efficiently coupled into the respective output ports, thereby minimizing various translational "walk-off effects" that may otherwise arise. Moreover, the multi-wavelength input optical signal is preferably collimated and circular in cross-section. The corresponding spectral channels diffracted from the diffraction grating 101 are generally elliptical in cross-section, e.g., they may be of the same size as the input beam in one dimension and elongated in the other dimension.

It is known that the diffraction efficiency of a diffraction grating is generally polarization-dependent. For instance, the diffraction efficiency of a grating in a standard mounting configuration may be considerably higher for p (or TM) polarization (perpendicular to the groove lines on the grating) than for s (or TE) polarization (orthogonal to p-polarization), or vice versa. To mitigate such polarization-sensitive effects, a quarter-wave plate 104 may be optically interposed between the diffraction grating 101 and the channel micromirrors 103, and preferably placed between the diffraction grating 101 and the focusing lens 102 as is shown in FIG. 1A. In this way, each spectral channel experiences a total rotation in polarization of approximately 90-degrees upon traversing the quarter-wave plate 104 twice. (That is, if an optical beam has p-polarization when first encountering the diffraction grating, it would have predominantly (if not all) s-polarization upon the second encountering, and vice versa.) This ensures that all the spectral channels incur nearly the same amount of "round-trip" polarization dependent loss.

In the aforementioned WSR apparatus, it would be very useful to be able to monitor the positions of the channel micromirrors, thereby facilitating control of multiple spectral channels coupled into the output ports on a channel-by-channel basis and in a dynamic (or real-time) fashion. This invention provides micromirror position sensing units that serve this need.

Figure 2A:
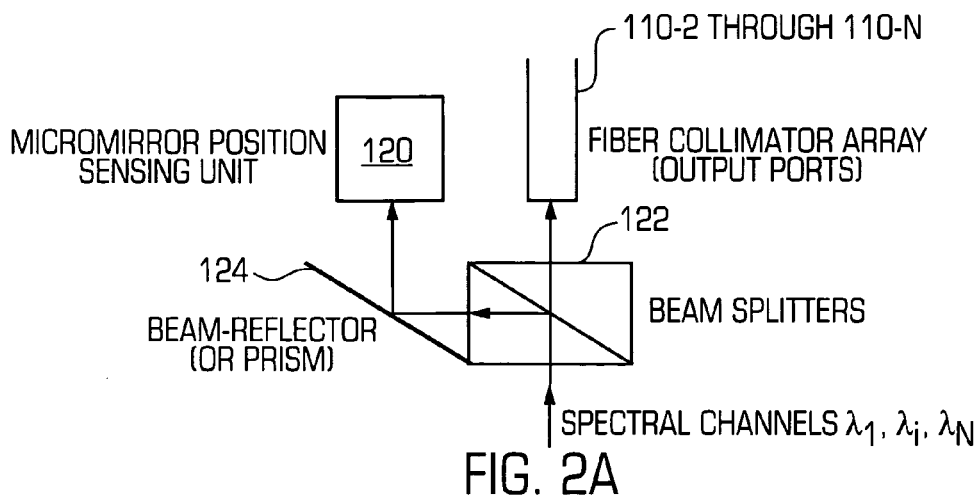
FIG. 2A is a schematic top view of one implementation of a micromirror position sensing apparatus within a WSR apparatus, according to the present invention.

FIG. 2A shows a schematic top view of how a micromirror position sensing unit or apparatus 120 may be implemented in a WSR apparatus, according to the present invention. For purpose of illustration and simplicity, the constituents of the WSR apparatus are not explicitly shown in the figure, other than an array of output ports, which may be in the form of fiber collimators (e.g., the fiber collimators 110-2 through 110-N in FIG. 1). Multiple spectral channels, after being deflected by the channel micromirrors and further multiplexed by the diffraction grating 101, are directed into the output ports. An assembly of (non-polarizing) beam-splitters 122 is placed in front of the output ports (e.g., between diffraction grating 101 and output ports 110-2 through 110-N) in a one-to-one correspondence, so as to divert a small portion or fraction (e.g., 1–5%) of the outgoing spectral channels to a micromirror position sensing unit 120.

Figure 2B:
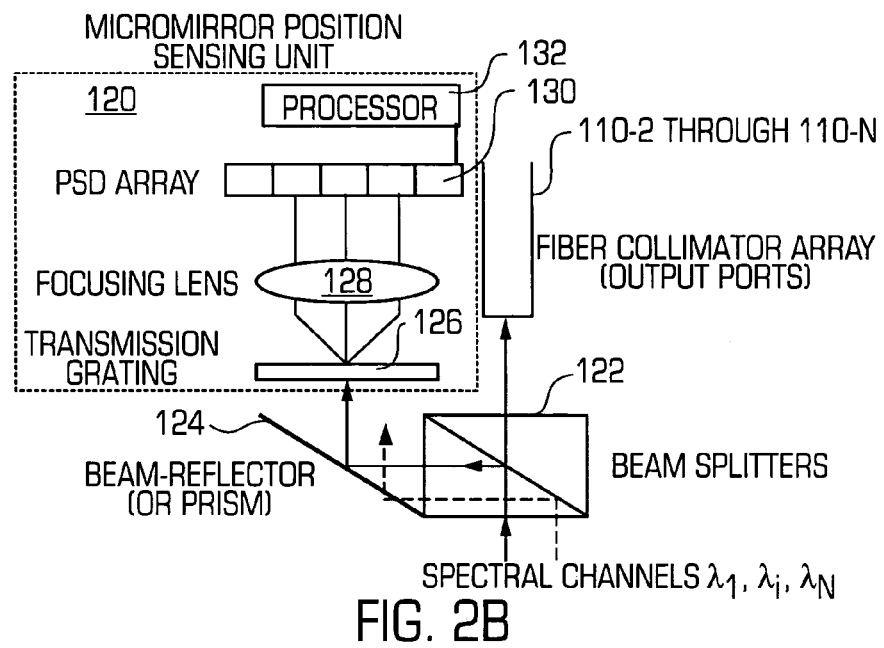
FIG. 2B is a schematic top view of one embodiment of a micromirror position sensing apparatus, which is implemented in a WSR apparatus in the manner shown in FIG. 2A.

FIG. 2B depicts an exemplary embodiment of a micromirror position sensing unit 120 of this invention. By way of example, the diverted fraction of the spectral channels is directed onto a wavelength-disperser in the form of a transmission grating 126 by way of a beam-reflector 124 (e.g., a mirror or a prism). The transmission grating 126 angularly separates the diverted spectral channels by wavelength. A beam-focuser in the form of a focusing lens 128 focuses the spatially separated spectral channels into corresponding spectral spots, impinging onto an array of position sensitive detectors (PSDs) 130 in a one-channel-per-PSD manner (e.g., each detector receives a separate spectral channel in a one-to-one ratio). Each PSD may measure the spot centroid location along a linear direction. The array of PSDs 130 may be communicatively coupled to a conventional processor 132 for monitoring the PSDs 130 to determine the position of the various micromirrors. Processor 132 may also be communicatively coupled to the array of micromirrors to provide dynamic control to the channel micromirrors, in response to the signals received from array 130. In alternate embodiments, processor 132 may further be communicatively coupled to and provide control to other elements of the optical apparatus 100, such as a servo-control unit, alignment mirrors, or any beam directing elements within the optical apparatus.

Figure 2C:
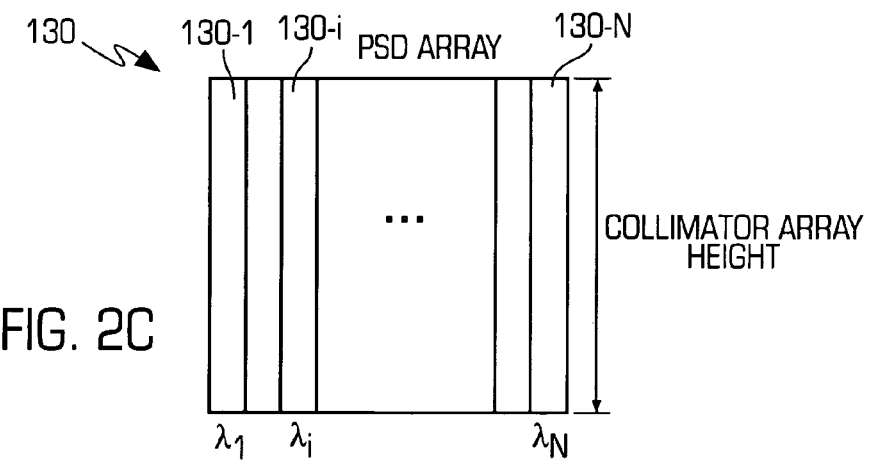
FIG. 2C is a schematic front view of an array of position sensitive detectors, which may be used within the micromirror position sensing apparatus shown in FIG. 2B.

FIG. 2C shows a schematic front view of the PSDs 130 shown in FIG. 2B. The PSDs may be positioned side-by-side, in parallel with the fiber collimator array in FIG. 2A (or 2B). Each PSD may be in the form of an elongated "stripe", whose length in the vertical direction is preferably equal to the distance between the top and bottom fiber collimators in the fiber collimator array (or equal to the distance between the top and bottom output ports—if all the output ports are positioned consecutively in the array). The beam-splitters in FIG. 2A may be configured such that the impinging positions of the spectral spots on the corresponding PSDs are indicative of the positions of their respective "parent" spectral channels in the vertical direction, and therefore also of the positions of the corresponding channel micromirrors. (In this case, one-dimensional PSDs may be used.) Hence, as the spectral channels undergo dynamic reconfiguration, the corresponding spectral spots on the respective PSDs move up or down, enabling the switching of the spectral channels to be monitored on an individual basis and in a real-time fashion (e.g., by use of processor 132).

To avoid being inadvertently coupled into "wrong" output ports during reconfiguration, the spectral channels may be displaced horizontally away from the respective output ports, as illustrated by dashed lines in FIG. 2B. This may be accomplished by using channel micromirrors that are pivotable about two (orthogonal) axes. It should be noted that such horizontal displacements would not alter the impinging positions of the corresponding spectral spots on the PSDs. (That is, so long as the optical beams incident onto the beam-splitters remain parallel, the optical beams with the same wavelength will be diffracted from the diffraction grating at the same diffraction angle, hence impinging onto the same PSD.)

In the embodiments of FIGS. 2A–2C, the wavelength-disperser may alternatively be a reflective diffraction grating, a dispersing prism, or other suitable wavelength-separating means known in the art. Other types of position-sensing means known in the art, such as quadrant detectors, may also be implemented, in lieu of the PSDs described above. A beam-splitter may also comprise prisms with a suitable thin-film coating sandwiched in between.

As such, the present invention provides a modular and versatile micromirror position sensing unit that can monitor the spatial routing of multiple spectral channels on an individual basis and in a real-time fashion. Such a unit can also be used to monitor and control the positions of the corresponding channel micromirrors. The micromirror position sensing unit of the present invention can be implemented in a variety of reconfigurable WDM optical systems, including dynamic optical add-drop multiplexers (OADMs), optical multiplexers/demultiplexers, and optical cross-connects.

Figure 3A:
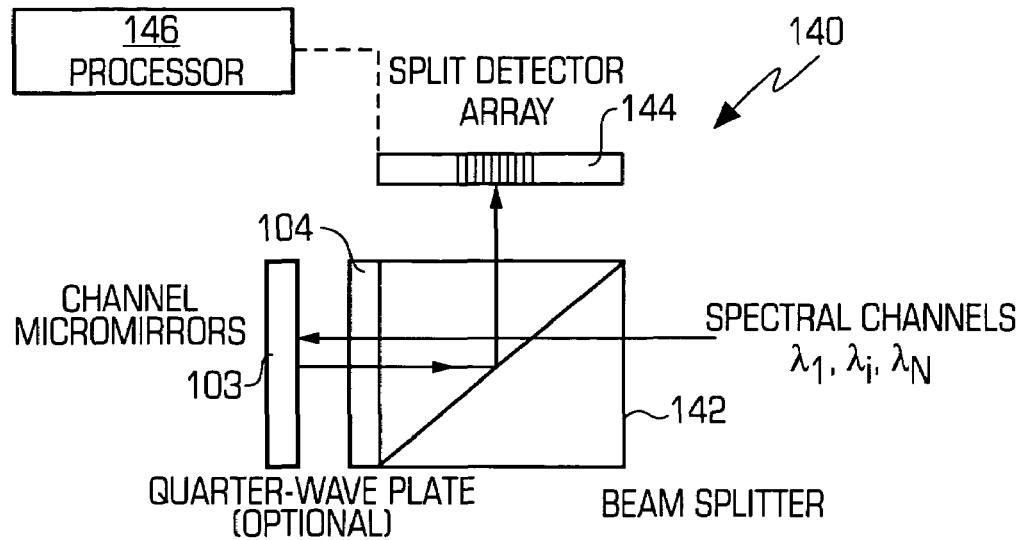
FIG. 3A is a schematic side view of one implementation of a second embodiment of a micromirror position sensing apparatus within a WSR apparatus, according to the present invention.

FIG. 3A shows a schematic side view of how an alternative micromirror position sensing unit or apparatus 140 may be implemented in a WSR apparatus, according to the present invention. For purpose of illustration and simplicity, the constituents of the WSR apparatus are not explicitly shown in the figure, other than an array of channel micromirrors (e.g., the channel micromirrors 103 in FIG. 1). By way of example, a (non-polarizing) beam-splitter 142 may be disposed along the optical path between the diffraction grating 101 and the channel micromirror array 103, so as to divert a small portion or fraction (e.g., 1–5%) of each reflected spectral channel to a position-sensing array 144 which in one form may comprise a plurality of split detectors. The configuration may be such that the diverted spectral channels impinge onto the split detectors in a one-to-one correspondence. In this case, a quarter-wave plate (e.g., the quarter-wave plate 104 in FIG. 1) may be placed between the channel micromirror array 103 and the beam-splitter 142, effective to provide for a net compensation for any PDL each spectral channel may incur in the system. The position sensing array 144 may be communicatively coupled to a conventional processor 146 for monitoring the split detectors to determine the position of the various micromirrors. Processor 146 may also be communicatively coupled to the array of micromirrors 103 to provide dynamic control to the channel micromirrors, in response to the signals received from array 144. In alternate embodiments, processor 132 may further be communicatively coupled to and provide control to other elements of the optical apparatus 100, such as a servo-control unit, alignment mirrors, or any beam directing elements within the optical apparatus.

Figure 3B:
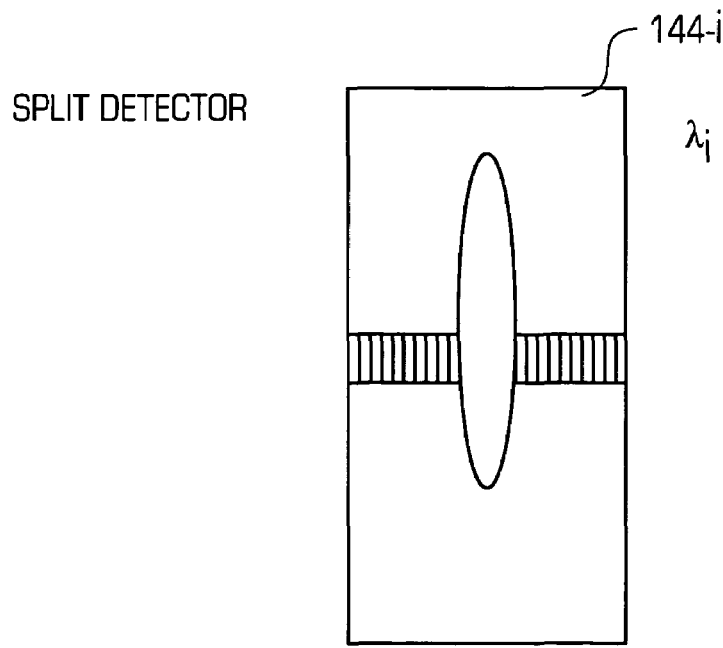
FIG. 3B is a front view of a split detector, which may be used within the micromirror position sensing apparatus shown in FIG. 3A.

FIG. 3B depicts a front (or bottom) view of an exemplary split detector 144-$i$ in the split detector array of FIG. 3A. The exemplary split detector may be assigned to the spectral channel $\lambda_i$, for instance. The real-time impinging position of the diverted fraction of the spectral channel $\lambda_i$ on the split detector may be effectively monitored, e.g., by utilizing an appropriate differential detection scheme known in the art. Thus, as the channel micromirror responsive to the spectral channel $\lambda_i$ undergoes pivoting motion during reconfiguration, the impinging position of the spectral spot $\lambda_i$ on the split detector varies correspondingly. This provides an effective way of monitoring the real-time position of the corresponding channel micromirror.

In the event that the channel micromirrors are biaxial, an array of quadrant detectors may be alternatively implemented in the embodiments of FIGS. 3A–3B, in lieu of the split detector array, such that a channel micromirror's position in two dimensions can be monitored. It will be appreciated that the position-sensing array in FIG. 3A may also comprise an array of one-dimensional (or two-dimensional) PSDs.

The present invention thus provides an alternative micromirror position sensing unit that can effectively monitor the positions of multiple channel micromirrors on an individual basis and in a real-time fashion. One skilled in the art will appreciate that such a unit can be utilized in a variety of applications, where an array of micromirrors is employed and their respective positions are desired to be monitored in a real-time fashion.

Those skilled in the art will recognize that the exemplary embodiments described above are provide by way of example, to elucidate the general principles of the present invention. Various means and methods can be devised to perform the designated functions in an equivalent manner. Moreover, various changes, substitutions, and alternations can be made herein without departing from the principles and the scope of the invention as set forth in the appended claims.

What is claimed is:

1. An optical apparatus comprising:
   multiple fiber elements providing an input port for a multi-wavelength optical signal and a plurality of output ports, wherein the input port and plurality of output ports are mutually distinct;
   a wavelength-separator that separates the multi-wavelength optical signal by wavelength into multiple spectral channels;
   an array of channel micromirrors positioned such that each channel micromirror receives a unique one of the spectral channels, the channel micromirrors being individually controllable to reflect the spectral channels into selected output ports;
   a micromirror position sensing unit which is disposed between the output ports and the channel micromirrors, the position sensing unit being adapted to receive portions of the reflected spectral channels for monitoring the position of the channel micromirrors; and
   a beam splitter which is adapted to divert portions of the reflected spectral channels to the micromirror position sensing unit.

2. The optical apparatus of claim 1 wherein the beam splitter is adapted to divert approximately one to five percent of the reflected spectral channels.

3. The optical apparatus of claim 2 further comprising:
   a beam reflector for directing the diverted portions of the reflected spectral channels to the micromirror position sensing unit.

4. The optical apparatus of claim 1 wherein the micromirror position sensing unit comprises an array of position sensitive detectors which receive the portions of the reflected spectral channels.

5. The optical apparatus of claim 4 wherein the micromirror position sensing unit further comprises a processor for monitoring the position sensitive detectors.

6. The optical apparatus of claim 1 further comprising a beam focuser for focusing the spectral channels into corresponding focused spots on the array of channel micromirrors.

7. The optical apparatus of claim 6 wherein the beam focuser comprises a focusing lens.

8. The optical apparatus of claim 1 wherein said wavelength-separator comprises a diffraction grating.

9. An optical apparatus comprising:
   multiple fiber elements providing an input port for a multi-wavelength optical signal and a plurality of output ports, wherein the input port and plurality of output ports are mutually distinct;
   a wavelength-separator that separates the multi-wavelength optical signal by wavelength into multiple spectral channels;
   an array of channel micromirrors positioned such that each channel micromirror receives a unique one of the spectral channels, the channel micromirrors being individually controllable to reflect the spectral channels into selected output ports; and
   a micromirror position sensing unit which is disposed between the output ports and the channel micromirrors, the position sensing unit being adapted to receive portions of the reflected spectral channels for monitoring the position of the channel micromirrors;
   wherein the micromirror position sensing unit comprises an array of position sensitive detectors which receive the portions of the reflected spectral channels; and
   wherein the micromirror position sensing unit further comprises a wavelength disperser for angularly separating the portions of the reflected spectral channels by wavelength.

10. The optical apparatus of claim 9 wherein the micromirror position sensing unit further comprises a focusing lens for focusing the portions of the reflected spectral channels into corresponding spectral spots, impinging on the array of position sensitive detectors.

11. The optical apparatus of claim 10 wherein each position sensitive detector receives a separate one of the spectral channels in a one-to-one ratio.

12. An optical apparatus comprising:
   multiple fiber elements providing an input port for a multi-wavelength optical signal and a plurality of output ports, wherein the input port and plurality of output ports are mutually distinct;
   a wavelength-separator that separates the multi-wavelength optical signal by wavelength into multiple spectral channels;
   an array of channel micromirrors positioned such that each channel micromirror receives a unique one of the spectral channels, the channel micromirrors being individually controllable to reflect the spectral channels into selected output ports; and
   a micromirror position sensing unit which is disposed between the output ports and the channel micromirrors, the position sensing unit being adapted to receive portions of the reflected spectral channels for monitoring the position of the channel micromirrors;
   wherein the micromirror position sensing unit comprises an array of split detectors which receive the portions of the reflected spectral channels.

13. The optical apparatus of claim 12 wherein each of the split detectors receives a separate one of the spectral channels in a one-to-one ratio.

14. The optical apparatus of claim 13 further comprising a quarter-wave plate disposed between the beam focuser and the wavelength separator for mitigating polarization-sensitive effects.

15. The optical apparatus of claim 12 wherein the micromirror position sensing unit further comprises a processor for monitoring the position sensitive detectors.

* * * * *